United States Patent
Casson et al.

US006955823B2

(10) Patent No.: US 6,955,823 B2
(45) Date of Patent: Oct. 18, 2005

(54) PROCESS FOR MAKING MICROCAPSULES INVOLVING PHASE INVERSION

(75) Inventors: Brian Derek Casson, Oxford (GB); Stephen Dawson, Huddersfield (GB); Neil George, Huddersfield (GB); Ian Malcolm Shirley, Bracknell (GB)

(73) Assignee: Syngenta Crop Protection, Inc., Greensboro, NC (US)

( * ) Notice: Subject to any disclaimer, the term of this patent is extended or adjusted under 35 U.S.C. 154(b) by 15 days.

(21) Appl. No.: 10/468,701

(22) PCT Filed: Feb. 25, 2002

(86) PCT No.: PCT/GB02/00832

§ 371 (c)(1),
(2), (4) Date: Jan. 12, 2004

(87) PCT Pub. No.: WO02/068111

PCT Pub. Date: Sep. 6, 2002

(65) Prior Publication Data

US 2004/0131691 A1 Jul. 8, 2004

(30) Foreign Application Priority Data

Feb. 26, 2001 (GB) .............................................. 0104698

(51) Int. Cl.⁷ ................................................. A61K 9/14
(52) U.S. Cl. ....................... 424/489; 264/4.1; 264/4.33; 264/4.4; 428/402.21; 424/498; 424/501
(58) Field of Search ................................ 264/4.1, 4.33, 264/4.4; 428/402.21; 424/489, 498, 501

(56) References Cited

U.S. PATENT DOCUMENTS

| | | | |
|---|---|---|---|
| 3,565,559 A | 2/1971 | Sato et al. | |
| 6,143,211 A | 11/2000 | Chickering et al. | |
| 6,190,773 B1 * | 2/2001 | Imamura et al. | 428/402 |

FOREIGN PATENT DOCUMENTS

| | | |
|---|---|---|
| GB | 1405108 | 9/1975 |
| JP | 11188257 | 7/1999 |
| WO | 97/03657 | 2/1997 |
| WO | 0164328 | 9/2001 |

* cited by examiner

Primary Examiner—Samuel A. Acquah
(74) Attorney, Agent, or Firm—Rose M. Allen

(57) ABSTRACT

A process for making microcapsules of an oil which are in dispersion in water comprises the steps of; (i) forming an initial dispersion of the oil in water in the presence of a surfactant, (ii) heating the initial dispersion above its phase inversion temperature, to form a bicontinuous phase composition, (iii) allowing or causing the composition to cool to below the phase inversion temperature so as to form an emulsion of oil droplets in the water, and (iv) encapsulating the oil droplets. The oil preferably has dissolved in it an oil-soluble or oil-dispersible active ingredient selected from agrochemicals, cosmetics, fragrances, sun-screens, ink-jet dyes, pigments, toners, biocides and pharmaceutical and veterinary products including drug delivery systems.

13 Claims, No Drawings

PROCESS FOR MAKING MICROCAPSULES INVOLVING PHASE INVERSION

This application is a 371 of International Application No. PCT/GB02/00832 filed Feb. 25, 2002, which claims priority to GB 0104698.6, filed Feb. 26, 2001, the contents of which are incorporated herein by reference.

The present invention relates to a process for producing microcapsules containing an oil, which are in dispersion in water.

Microcapsules containing oils which are in dispersion in water are known. They have wide commercial applicability, for example as slow release formulations, or to provide a polymer barrier to reduce physical contact between a user and the encapsulated material.

These microcapsules are typically produced by a process in which the oil is dispersed by high-shear disperser in water in the presence of a surfactant so as to form a dispersion of oil droplets in water, followed by an encapsulation step in which, typically, two or more polymer precursor materials are reacted to form a polymeric capsule wall around the oil droplets.

One problem with this known process is that the use of a high-shear disperser is relatively energy-intensive and also requires somewhat specialist equipment, particularly for large-scale production. Another problem is that it is difficult to make small microcapsules, for example around 1 micrometer or less, without excessive amounts of surfactant. To a certain extent, it is possible to reduce the required shear by using more surfactant, or to use less surfactant by using a higher shear, but neither alternative is desirable. A still further problem is that the microcapsule particle size distribution can be relatively broad, and in particular, there can be an undesirable level of very fine particles which can lead to toxicity problems.

The present invention allows the production of microcapsules of oil which are in dispersion in water by a process with an improved balance of relatively low shear mixing and relatively low surfactant levels for a given microcapsule size. The process also gives a narrower microcapsule size distribution than many known processes and allows the production of small microcapsules, for example in the nanometer range.

In JP11188257 there is described the production of a microcapsule having a core composed of a water-insoluble thermoplastic compound coated by a polyurea shell. The microcapsule is prepared by first forming a water in oil emulsion using a specified non-ionic surfactant and subsequently adding water to cause phase inversion and form an oil-in-water emulsion.

In WO 97/03657 there is described a method for microencapsulating an agent to form a microencapsulated product by means of a process described therein as "phase inversion nanoencapsulation" or "PIN". PIN is said to differ from existing methods of encapsulation in that it is essentially a one-step process, is nearly instantaneous, and does not require emulsification of the solvent. It is stated that under proper conditions, low viscosity polymer solutions can be forced to phase invert into fragmented spherical polymer particles when added to appropriate non-solvents.

We have now found that significant advantages may be obtained if temperature-induced phase inversion is used to form microencapsulated systems.

According to the present invention there is provided a process for making microcapsules of an oil which are in dispersion in water comprising the steps of;
i) forming an initial dispersion of the oil in water in the presence of a surfactant,
ii) heating the initial dispersion above its phase inversion temperature, to form a bicontinuous phase composition,
iii) allowing or causing the composition to cool to below the phase inversion temperature so as to form an emulsion of oil droplets in the water,
iv) encapsulating the oil droplets.

The term 'oil' is used to mean a liquid which is not miscible with water under the conditions of the process. A wide variety of materials suitable for use as the oil will occur to one skilled in the art. Examples include diesel oil, isoparaffin, aromatic solvents, particularly alkyl substituted benzenes such as xylene or propyl benzene fractions, and mixed naphthalene and alkyl naphthalene fractions; mineral oils, white oil, castor oil, sunflower oil, kerosene, dialkyl amides of fatty acids, particularly the dimethyl amides of fatty acids such as caprylic acid; chlorinated aliphatic and aromatic hydrocarbons such as 1,1,1-trichloroethane and chlorobenzene, esters of glycol derivatives, such as the acetate of the n-butyl, ethyl, or methyl ether of diethylene glycol, the acetate of the methyl ether of dipropylene glycol, ketones such as isophorone and trimethylcyclohexanone (dihydroisophorone) and esters such as hexyl or heptyl acetate, methyl oleate or octyl methyl cinnamate. Preferred oils are cyclohexane, decahydronaphthalene, xylene, diesel oil, isoparaffins and alkyl substituted benzenes and naphthalenes, such as those sold under the SOLVESSO trade mark by Multisol Ltd, particularly preferred are mixtures of decahydronaphthalene and SOLVESSO 200. A mixture of aromatic and aliphatic oils gives a particularly good balance between dissolving active ingredients and at the same time requiring a minimum of surfactant to form small microcapsules.

The oil preferably carries an oil-soluble active ingredient dissolved in it or an oil-dispersible active ingredient dispersed in it. The oil-soluble or dispersible active ingredient is preferably water-insoluble. The term "water-insoluble" as used herein should not be taken to mean that no trace of active ingredient transfers to the aqueous phase. It is sufficient that the active ingredient has a sufficiently low water solubility such that only a minor proportion of the active ingredient transfers from the oil phase and is thereby dissolved in the aqueous phase. Naturally any active ingredient which transfers to the aqueous phase will not be encapsulated and excessive transfer of active ingredient to the aqueous phase may even interfere with the encapsulation process. Preferably the solubility of the active ingredient in water at 25° C. is less than 10 mg/ml, for example less than 1 mg/ml and in particular less than 0.1 mg/ml. Oil-dispersible active ingredients will generally be retained within the oil phase during emulsification and phase inversion. Thus the oil-dispersible active ingredient suitably has a greater affinity for the oil phase than the aqueous phase such that it either does not transfer from the oil phase into the aqueous phase as a dispersion during emulsification or only a minor proportion transfers from the oil phase.

It will be appreciated that the process of the present invention does not depend critically on the nature of the active ingredient which is generally retained within the oil both during phase inversion and in the final microencapsulated product. Similarly, the utility of the active ingredient is not critical and the term "active ingredient" as used herein includes any material having a utility which is consistent with a presentation in microencapsulated form. Particularly suitable active ingredients are oil-soluble agrochemicals, cosmetics, fragrances, sun-screens, ink-jet dyes, pigments, toners, biocides and pharmaceutical and veterinary products including drug delivery systems. Suitable agrochemicals include one or more herbicide, plant growth regulator, fungicide, insecticide or nematicide. Illustrative examples of suitable agrochemicals include the insecticides tefluthrin, abamectin, lambda cyhalothrin and its component isomers such as gamma cyhalothrin and the strobilurin family of fungicides. Those skilled in the art will be well aware of numerous agrochemicals suitable for encapsulation in the process of the present invention. Suitable agrochemicals are listed in standard reference works such as the Pesticide Manual published by the British Crop Protection Council. Suitable pharmaceutical products include pharmacologically active compounds such as anti-cancer agents, steroids, antihypertensive agents, beta-blockers, hypolipidaemic agents, anticoagulants, antithrombotics, antifungal agents, antiviral agents, antibiotics, antibacterial agents, antipsychotic agents, antidepressants, sedatives, anaesthetics, antiinflammatory agents, antihistamines, hormones, immunomodifiers or contraceptive agents. The process of the present invention is not limited to active materials known at the date hereof and will be capable of being applied to suitable active ingredients which may be developed subsequently.

It is also possible to use a liquid active ingredient as the oil without further dilution by solvent. Examples of suitable liquid active ingredients which may be used as the oil are a liquid ester of the herbicide 2,4-D, liquid esters of the herbicides fluazifop or fluazifop-P. Water-insoluble active ingredients having a melting point below the relevant phase inversion temperature may be dispersed in the form of a melt. An example of a suitable low-melting water-insoluble material is the fungicide picoxystrobin.

In some instances, the rate of release of the active material may be significantly affected by the nature of the oil phase. The oil phase can also exert an adjuvancy effect, increasing the bioefficacy of the active ingredient contained within the formulations. Suitable examples of oils that can exert an adjuvant effect include mineral oils, paraffin oils, diesel oils, vegetable oils and especially the esterified vegetable oils such as methyl oleate or methyl rapate.

The volume ratio of the oil to the water is preferably 10:90 to 90:10, more preferably 15:85 to 60:40, most preferably 20:80 to 50:50.

The initial dispersion can be made using a conventional stirrer, such as a paddle stirrer or a high-speed stirrer, such as an Ultraturrax (trade mark of IKA Labortechnik) or Silverson disperser. The particle size of the initial dispersion is not crucial to the invention because the final encapsulated particle size is determined by steps (ii) and (iii) and the type and level of surfactant. For example, the initial dispersion can have a particle size of anything up to about 100 μm or more, although initial dispersions of between 1 and 10 μm are preferred. The initial dispersion does not need to be stable in the long-term, it only needs to remain stable long enough to carry out step (ii).

Batch or in-line methods may be used to carry out the process of the present invention. In-line methods enable formation of the emulsion by pumping the oil and aqueous phases through an in-line mixer. The emulsion thus formed may be pumped at an appropriate rate through a heated tube so as to raise the composition above its phase inversion temperature. The bicontinuous phase is then pumped into a stirred vessel at a temperature below the phase inversion temperature and the encapsulation reaction is then carried out The surfactant comprises a hydrophilic portion and a hydrophobic portion. The hydrophilic portion must comprise a water-soluble moiety that has a reduced solubility in water at increased temperature so that the initial dispersion has a phase inversion temperature.

An example of a water-soluble moiety that has a reduced solubility in water at increased temperature is a polymer comprising ethylene glycol units, that is, units of the formula;

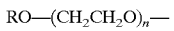

In which R can be H or C1–4 alkyl, preferably H or methyl and n can be 2 to 100, preferably 5 to 50, more preferably 8 to 40. These are commonly referred to as poly (ethylene oxide) groups. The hydrophilic portion can also comprise other glycols, such as propylene glycol provided that ethylene glycol makes up at least 50% by weight of the hydrophilic portion, preferably at least 75% by weight, more preferably at least 90% by weight and most preferably all.

Examples of other water-soluble moieties that can be present are anionic groups, such as carboxyl groups or sulphate groups, and cationic groups such as quaternary amine groups.

Poly (ethylene oxide)-based surfactants are well known and widely commercialised. Examples are condensates of alkyl phenols with ethylene oxide and optionally propylene oxide, such as the nonylphenol polyethoxylates and octylphenol polyethoxylates sold under the trade mark SYNPERONIC by Uniqema, block copolymers of poly (ethylene oxide) and poly (propylene oxide) available under the trade mark PLURONIC from BASF, condensation products of sorbitan esters and ethylene oxide available under the trade mark TWEEN, condensates of C8 to C30 alkanols with from 2 to 80 molar proportions of ethylene oxide and optionally propylene oxide, and polymeric surfactants such as acrylic and vinyl copolymers of poly (ethylene glycol) acrylate or methacrylate with hydrophobic monomers such as methyl methacrylate and butyl acrylate.

The hydrophobic portion of the surfactant comprises a moiety that is soluble in the oil. The surfactants is therefore chosen so as to have an appropriate hydrophobic portion depending on the oil being used and suitable hydrophobic moieties will readily occur to those skilled in the art. For example, alkyl groups are generally soluble in aliphatic hydrocarbon solvents and aromatic groups are generally soluble in aromatic solvents. Mixed aliphatic and aromatic groups can also be used, such as alkyl phenols, particularly C4–20 alkyl phenols, such as nonyl or octyl phenols.

Particularly useful surfactants are alkyl phenol ethoxylates, having 2 to 100 ethylene oxide units.

Mixtures of surfactants can be used. For example, mixtures of ethylene oxide-based surfactants or mixtures of ethylene oxide-based surfactants and ionic surfactants, provided always that the initial dispersion has a phase inversion temperature.

The amount of the surfactant is preferably 0.5 to 30% by weight based on the weight of the oil, more preferably 5 to 25%, most preferably 7 to 20%, particularly 8 to 18%.

In step (ii), the phase inversion temperature is the temperature at which the affinity of the surfactant for each of the phases is the same. At this temperature, the interfacial tension between the phases is at a minimum. This results in the formation of a bicontinuous phase composition in which there are regions of oil phase and water phase, separated by surfactant, but these regions have no predetermined shape and in particular they do not have the typical dispersion structure of droplets in a continuous phase. It is the breakdown of this bicontinuous structure that allows the formation of very small droplets when the mixture is subsequently cooled.

It is to be noted therefore that whilst the process of the present invention involves the formation of a bicontinuous phase in the region of the phase inversion temperature, both the initial dispersion formed in stage (i) and the dispersion which is encapsulated in stage (iv) after cooling below the phase inversion temperature are oil-in-water dispersions. Whilst the scope of the present invention does not preclude there being a change in the ratio of the aqueous and organic phases, it is a feature of the present invention that phase inversion takes place as a result of the change in temperature in the region of the phase inversion temperature and in most embodiments of the invention there will be no change in the ratio of the aqueous and organic phases.

The phase inversion temperature can be determined by observing a sample of the composition dispersion produced in step (i) under a microscope which is fitted with a heated stage. As the temperature rises and passes through the phase inversion temperature, the initial oil-in-water emulsion can clearly be seen to break down into a continuous phase. This change takes place over a relatively small temperature range of around 0.5° C., the upper end of which is regarded as the phase inversion temperature. If the temperature rises further, typically 2–10° C. further, the continuous phase breaks down once more into a complex water-in-oil emulsion. In step (ii), there is no benefit in heating to temperatures very much above the phase inversion temperature, and this has the disadvantage of using more energy and requires greater process time both in heating and subsequent cooling. Typically the mixture is heated to around 5 to 10° C. above the phase inversion temperature. Typical phase inversion temperatures are in the region of 30, to 90° C.

Preferably the mixture is stirred when it is above the phase inversion temperature. The stirring can be applied by using a simple low-shear stirrer, for example a paddle stirrer, at low speeds, for example at around 300 rpm. High speed stirrers can be used, but they are not necessary, because it is only necessary to keep the composition mixed, and there is no requirement to physically break up droplets.

In one modification of the process, steps (i) and (ii) can be combined in that the initial emulsion can be made at or above the phase inversion temperature. For example, the oil can be poured and stirred into the water at a temperature above the phase inversion temperature, if necessary with heating to maintain the temperature above the phase inversion temperature.

Stirring is generally continued in step (iii) when the mixture is cooling below the phase inversion temperature. Preferably, stirring is continued until the oil droplets have been encapsulated. It may be preferred to cool the mixture quickly in step (iii) because this may minimise coalescence of the emulsion prior to encapsulation. For example, the mixture can be cooled at a speed of 1° C. per minute or faster. In one embodiment of the present invention more rapid cooling can be achieved by adding cold water to the dispersion, thereby simultaneously changing the ratio of the aqueous and organic phases.

If desired steps (ii) and (iii) may be repeated one or more times before the encapsulation of the oil droplets in stage (iv). In some circumstances cycling through the phase inversion temperature in this manner may produce a finer dispersion.

The encapsulation step (iv) is carried out by forming a polymer wall around the oil droplets. Preferably the polymer wall is formed by the reaction of two or more polymer precursors. Many such polymer precursors are known and suitable polymer precursors and reaction conditions can be selected by one skilled in the art to provide a polymer wall thickness and durability ranging from relatively transient polymer walls which can readily be disrupted to relatively durable polymer walls which provide slow release over a considerable period of time. Polymer precursors are also known which provide a polymer wall material which is degraded by external factors. Thus for example once an agrochemical formulation is diluted into water for application onto a target crop, the polymer wall material may be disrupted by the change in osmotic pressure within the encapsulated droplets or for example may be degraded under the action of sunlight.

A further example is the incorporation into the wall of groups that can be chemically cleaved by appropriate reagents. The incorporation of such base cleavable groups into aminoplast walls is described in WO 00/05951.

Polymer precursors generally comprise two or more components that react together to form a crosslinked polymer wall. A wide range of polymer precursors is known for use in encapsulation. Polyisocyanates which can be reacted with polyamines, with polyols or with polythiols. Polyfunctional acid chlorides which can be reacted with polyols or polyamides. Aminoplast resins, such as melarnine formaldehydes and phenol formaldehydes which can be reacted with polyols or polythiols.

Depending on the solubility of the wall forming components in the oil and in water, one component can be dissolved in the oil and the other component can be dissolved in the water so that reaction between the two to form the capsule wall occurs at the interface between the two.

Alternatively, in a preferred process, in the case where reaction between the components is relatively slow in the absence of catalyst, the components can be dissolved together in the oil before making the initial dispersion, and a water-soluble phase transfer catalyst can be added to the water in step (iv) to cause reaction between them to form the capsule wall at the oil droplet surface.

This type of process is illustrated by aminoplasts which can be reacted with a crosslinker such a polythiol as described for example in U.S. Pat. No. 4,956,129 and U.S. Pat. No. 5,332,584. The reaction between the two components is slow in the absence of catalyst and both components can be dissolved in the oil together. The wall-forming reaction can be initiated by adding a water-soluble phase transfer catalyst to the water. For example, an aminoplast resin, such as Beetle 80 (an etherified urea formaldehyde, trade mark of American Cyanamid) can be dissolved in the oil, together with a crosslinker, for example a polythiol such as pentaerythritol tetrakis (3-mercaptopropionate) prior to step (i), and then a phase transfer catalyst such as an alkylnaphthalene sodium sulphonate can be added to the emulsion after step (iii) to cause a polymer wall to form at the oil/water interface so encapsulating the oil phase droplets.

A further type of process for by which aminoplast walls can be formed is described in WO 01/19509.

Coacervate chemistries can also be employed to good effect for these formulations. Many techniques of producing a coacervate are known. Such techniques include gelatin/gum arabic systems and the synthetic pairing effects of polymeric anionic/cationic systems.

It will be appreciated that the present invention provides microcapsules containing the oil, optionally containing an oil-soluble active material, and a distinct aqueous continuous phase separated therefrom by the microcapsule wails. It is possible therefore to include a water-soluble active material in the continuous phase. Such water-soluble active material may be a material which is incompatible with any oil-soluble active material present, for example a second agrochemical or an agrochemical adjuvant. Alternatively, it may be desirable to include a second active material in the continuous aqueous phase to provide a rapid action which is subsequently followed by a slow-release effect of the encapsulated material.

The microcapsules produced by the process of the present invention can be used for a wide range of applications, depending on the active ingredient. For example, encapsulated agrochemicals produced according to the present invention can be applied to plants or to soil either to kill or inhibit unwanted plants in the case where the active ingredient is a herbicide, or to kill pests such as insects, fungi or nematodes where the active ingredient is an insecticide, fungicide or nematicide respectively.

EXAMPLE 1

This Example illustrates the preparation of tefluthrin microcapsules. An oil phase which was a mixture of Solvesso 200 (an alkyl naphthalene from Multisol Ltd, Nantwich UK: 6.37 g), decahydronaphthalene (a mixture of cis and trans, from Aldrich: 6.37 g), Beetle 80 (an etherified urea-formaldehyde resin from Cyanamid: 1.59 g), Q43 (pentaerythritol tetrakis (3-mercaptopropionate) from Aldrich: 0.68 g) and tefluthrin (insecticide from Syngenta Agrochemicals: 1.5 g) was dispersed in a solution of Synperonic OP11 (nonylphenol polyethoxylate surfactant having an average of eleven ethylene oxide units, from Uniqema, UK: 2.0 g) in deionised water (35 g) using an Ultraturrax disperser (from IKA Labortechnik) at 9500 rpm for 1 minute to form an initial dispersion. The amount of surfactant was 12.1% by weight, based on the weight of the oil phase. The initial dispersion had a median particle size of 2.9 $\mu$m (measured by laser light scattering using a Malvern Mastersizer)

A drop of this initial dispersion was transferred by capillary tube to a microscope cover slip and this sample was covered with a second cover slip and the edges of the two slips were sealed together using 'superglue' (fast-acting cyanoacrylate adhesive). The sealed sample was placed on a heated stage of a microscope, and the temperature was raised slowly (about 4° C. per minute). Observing the sample through the microscope (2000× magnification) the droplets of the dispersion could clearly be seen to grow and coalesce into indistinct regions at 67° C. or above, and to reform into a dispersion at below this temperature. The transition took place with 0.5° C. Thus the phase transition temperature of the dispersion was measured to be 67° C.

Returning to the main initial dispersion, the temperature was raised at about 2° C./min to 77° C. while the Ultraturrax disperser was running at 9500 rpm and then the temperature was lowered, at about 2° C./min, to 57° C. with the disperser still running. Finally the emulsion was allowed to cool to 40° C. The emulsion had a median particle size of 377 nm (measured by laser light scattering using a Malvern Mastersizer).

The Ultraturrax disperser was removed and the emulsion was stirred at 100 rpm using a paddle stirrer. The pH was lowered to 1.9 by adding concentrated sulphuric acid. Petrobaf (sodium alkylnaphthalene sulphonate phase transfer catalyst from Witco: 0.5 g) was added and the mixture was stirred at 40° C. overnight to carry out the encapsulation step. The pH was raised to 7 by addition of 0.5% sodium hydrogen carbonate solution.

The resulting capsules of tefluthrin in Solvesso 200/decahydronaphthalene had a diameter of 100 nm to 1000 nm as measured by scanning electron microscope.

EXAMPLE 2

This Example illustrates the use of low-shear to form the initial dispersion. An oil phase which was a mixture of Solvesso 200 (an alkyl naphthalene from Multisol Ltd, Nantwich UK: 6.37 g), decahydronaphthalene (a mixture of cis and trans, from Aldrich: 6.37 g), Beetle 80 (an etherified urea-formaldehyde resin from Cyanamid: 1.59 g), and Q43 (pentaerythritol tetrakis (3-mercaptopropionate) from Aldrich: 0.68 g) was dispersed in a solution of Synperonic OP11 (nonylphenol polyethoxylate surfactant having an average of eleven ethylene oxide units, from Uniqema, UK: 2.0 g) in deionised water (35 g) using a paddle stirrer at 150 rpm for 1 minute to form an initial dispersion. The amount of surfactant was 12.1% by weight, based on the weight of the oil phase. The initial dispersion had a median particle size of 6.7 $\mu$m (measured by laser light scattering using a Malvern Mastersizer)

A drop of this initial dispersion was transferred by capillary tube to a microscope cover slip and this sample was covered with a second cover slip and the edges of the two slips were sealed together using 'superglue' (fast-acting cyanoacrylate adhesive). The sealed sample was placed on a heated stage of a microscope, and the temperature was raised slowly (about 4° C. per minute). Observing the sample through the microscope (2000× magnification) the droplets of the dispersion could clearly be seen to grow and coalesce into indistinct regions at 67° C. or above, and to reform into a dispersion at below this temperature. The transition took place with 0.5° C. Thus the phase transition temperature of the dispersion was measured to be 67° C.

Returning to the main initial dispersion, the temperature was raised at about 2° C./min to 77° C. while the paddle stirrer was running at 150 rpm and then the temperature was lowered, at about 2° C./min, to 57° C. with the stirrer still running. Finally the emulsion was allowed to cool to 40° C. The emulsion had a median particle size of 626 nm (measured by laser light scattering using a Malvern Mastersizer).

Stirring was continued at 150 rpm. The pH was lowered to 1.9 by adding concentrated sulphuric acid. Petrobaf (sodium alkylnaphthalene sulphonate phase transfer catalyst from Witco: 0.5 g) was added and the mixture was stirred at 40° C. overnight to carry out the encapsulation step. The pH was raised to 7 by addition of 0.5% sodium hydrogen carbonate solution.

The resulting capsules of Solvesso 200/decahydronaphthalene had a diameter of 100 nm to 1000 nm as measured by scanning electron microscope.

EXAMPLE 3

This Example compares the use of temperature-induced phase inversion according to the present invention and phase inversion induced by changing the oil/water phase ratio.

Temperature induced phase inversion was carried out as follows:

The system contained 28.8% w/w oil phase; consisting of 12.2% w/w Alkyl naphthalene solvent (Solvesso 200), 12.2% w/w Decahydronaphthalene (Decalin) and encapsulation components 3.1% w/w Urea Formaldehyde resin (Beetle-80) and 1.3% w/w Pentaerythritol tetrakis (3-mercapto propionate) cross-linker (Q43); the aqueous phase contained 3.8% w/w octyl phenyl ethoxylate surfactant (OP11). Direct emulsification under low shear (paddle agitator, 300 rpm) produced a dispersion with a broad droplet size distribution.

After direct emulsification agitation was suspended and the emulsion was heated above its phase inversion temperature(55° C.) and then cooled rapidly with stirring. The interfacial polymerisation was activated by one hour mixing after addition of concentrated sulphuric acid (to adjust pH to 1.9) and a alkylnaphthalene sulphonate phase transfer catalyst (Petro BAF (1% w/w)). The resultant encapsulated dispersion consisted of particles where 90% by volume was below 1.9 $\mu$m and with a large proportion towards 200 nm and Scanning Electron Microscopy (SEM) confirmed the primary capsule diameter to be circa 200 nm.

In a comparison under the same chemical conditions, phase inversion was brought about by a change in the water to oil phase ratio (catastrophic phase inversion). The addition of water (35 g), over a period of one hour, to a mixture of oil (Solvesso 12.2% w/w/Decalin 12.2% w/w) and surfactant (OP11, 3.8% w/w) produced an oil-in-water dispersion of 10$\mu$ droplets with no sub-micron droplets. This droplet size is typical for a low energy agitation system (paddle agitator as above). A sample after encapsulation at 20° C. had a particle size where 90% of the particles were below 250$\mu$ and a primary peak around 15–20 $\mu$ and indicated the presence of some 200$\mu$ particles.

The emulsification was repeated but with water added over a period of 1 minute in an attempt to reduce the droplet size. Fast water addition produced essentially the same result.

Comparison of the particle size distributions showed that much smaller droplets were produced by temperature induced phase inversion than by the catastrophic phase inversion route.

EXAMPLE 4

This Example illustrates that it is unnecessary to use high shear during phase inversion. The system contained 28.8% w/w oil phase; consisting of 12.2% w/w Solvesso 200, 12.2% w/w Decalin and encapsulation components 3.1% w/w Beetle-80 and 1.3% w/w Q43; the aqueous phase contained 3.8% w/w OP11 surfactant. Direct emulsification produced a fine dispersion of 2$\mu$ droplets. The system was both heated (65° C.) and cooled rapidly (40° C.) in the presence of a high shear mixer (9,500 rpm). Concentrated sulphuric acid was added to reduce the pH to 1.9 along with Petro BAF to catalyse the interfacial polymerisation (20 hour reaction). The final capsule diameter was approximately 200 nm by SEM.

The above procedure was repeated except the system was not agitated during heating and low shear was applied during cooling. The mixture phase separated forming two distinct layers when heated above the phase inversion temperature. Mild agitation was applied (300 rpm, paddle agitator) when the temperature reached 65° C. and continued during the cooling and encapsulation stages of the reaction. The size distribution prior to encapsulation was the same for high shear and the encapsulated dispersion consisted of primary particles of the same size. Aggregation of some these particles during encapsulation led to a peak around 1.5 um in the volume size distribution. Fine particles were thus generated and encapsulated without the need for high shear.

EXAMPLE 5

The general procedure of the first part of Example 3 (encapsulation by the temperature induced phase inversion process) was repeated except that high shear mixing was used during heating and cooling and octyl methyl cinnamate replaced Solvesso in the oil phase. The system was heated above its phase inversion temperature(67° C.) and was rapidly cooled to 40° C. and held at this temperature for 20 hours. The resultant capsule dispersion was very stable with a particle diameter of 200 nm.

EXAMPLE 6

The general procedure of the first part of Example 3 was repeated except that the system contained 30% w/w Exxate900 (a C-9 acetate ester) and 9% w/w OP11 surfactant. Direct emulsification of the mixture produced 7$\mu$ droplets. The system was heated above its phase inversion temperature (65° C.) without agitation. The mixture was rapidly cooled (20° C.) with stirring (300 rpm, paddle agitator) and the final encapsulated droplet diameter was 3$\mu$.

EXAMPLE 7

The general procedure of the first part of Example 3 was repeated. The system contained 23.2% w/w oil phase; consisting of 10% w/w octyl methyl cinnamate, 10% w/w picoxystrobin insecticide and encapsulation components 2.2% w/w Beetle-80 and 1% w/w Q43; the aqueous phase contained a blend of two nonyl phenol ethoxylate surfactants, 24% w/w NP30 and 6% w/w NP8. Direct emulsification produced droplets in the 2–10$\mu$ size range. The system underwent phase inversion at 75° C. SEM showed the primary capsule diameter to be circa 200 nm.

EXAMPLE 8

The procedure of Example 7 was followed except the system contained 29.9% w/w oil phase; consisting of 24.3% w/w Exxate1000 (a C-10 acetate ester) 1% w/w picoxystrobin and encapsulation components 3.2% w/w Beetle-80 and 1.4% w/w Q43; the aqueous phase contained a blend of alcohol ethoxylate (14.8% w/w, SYNPERONIC A9) and sodium dodecyl sulphate (0.16% w/w) surfactants. Direct emulsification of the two phases using a paddle agitator (300 rpm) produced a fine dispersion of 2$\mu$ droplets. The system underwent a phase inversion when cooled to 74° C. SEM showed diameter of the primary encapsulated material to be about 200 nm.

EXAMPLE 9

The general procedure of the first part of Example 3 was repeated. The system contained 30.5% w/w oil phase; consisting of 12.7% w/w Solvesso 200 and 12.7% w/w Decalin; the aqueous phase contained 0.4% w/w octadecanol and 3.8% w/w octylphenol ethoxylate (OP10) surfactant. Direct emulsification produced droplets in the 2–10$\mu$ size range. The system was both heated (90° C.) and cooled slowly (40° C.) in the presence of a paddle agitator (300 rpm). A fine dispersion of 200 nm capsules was produced.

EXAMPLE 10

The general procedure of the first part of Example 3 was repeated. The system contained 28.8% w/w oil phase; consisting of 0.6% w/w azoxystrobin, 12.2% w/w Solvesso 200 and 12.2% w/w Decalin; the aqueous phase contained 3.8% w/w OP11 surfactant. Direct emulsification produced droplets in the 2–10$\mu$ size range. The system was both heated (70° C.) and cooled slowly (20° C.) in the presence of a high shear mixer (9,500 rpm). A fine dispersion of 200 nm capsules? was produced

EXAMPLE 11

An emulsification system contained 30.9% w/w oil phase; consisting of 2.8% w/w tefluthrin, 11.9% w/w Solvesso 200, 11.9% w/w Decalin and encapsulation components 3.0% w/w Beetle-80 and 1.3% w/w Q43; the aqueous phase contained 3.7% w/w OP11 surfactant. Direct emulsification produced a dispersion of 2–10μ droplets. The system was heated (75° C.) above its phase inversion temperature (67° C.) and cooled rapidly (20° C.) in the presence of a high shear mixer (9,500 rpm). Concentrated sulphuric acid was added to reduce the pH to 1.9 along with Petro BAF to catalyse the interfacial polymerisation. The encapsulated dispersion had a bimodal size distribution with peaks at 180 nm and 1.5μ. SEM confirmed the droplet size; SEM clearly showed the majority of the particles to be sub-micron in size.

EXAMPLE 12

The general procedure of the first part of Example 3 was followed. The emulsification system contained 30.1% w/w oil phase; consisting of 24.5% w/w methyl oleate, 1% w/w picoxystrobin and encapsulation components 3.2% w/w Beetle-80 and 1.4% w/w Q43; the aqueous phase contained 14.9% w/w SYNPERONIC A9 surfactant. Direct emulsification produced droplets in the 2–10μ size range. The system underwent phase inversion at 78° C. SEM showed the primary capsule diameter to be circa 200 nm.

EXAMPLE 13

The general procedure of the first part of Example 3 was followed. The system contained 30% w/w oil phase; consisting of 18.7% w/w Solvesso, 4.7% w/w Decalin, 2% w/w Abamectin and encapsulation components 3.2% w/w Beetle-80 and 1.4% w/w Q43; the aqueous phase contained 14.9% w/w SYNPERONIC OP11 surfactant. Direct emulsification produced droplets in the 2–10μ size range. The system underwent phase inversion at 41° C. The encapsulated dispersion had a bimodal size distribution with peaks at 200 nm and 25μ. SEM clearly showed the majority of the particles to be sub-micron in size. The larger particles were fused aggregates of primary particles.

EXAMPLE 14

The general procedure of the first part of Example 3 was followed except that in this case the molten fungicide picoxystrobin was used as both active ingredient and oil phase. The system contained 11.4% w/w oil phase; consisting of 10% w/w picoxystrobin and encapsulation components 1% w/w Beetle-80 and 0.4% w/w Q43; the aqueous phase contained a blend of two nonyl phenol ethoxylate surfactants, 21% w/w NP30 and 9% w/w NP8. Direct emulsification produced droplets in the 2–10μ size range. The system underwent phase inversion at 67° C. The system crystallised during the polymerisation process but SEM confirmed the successful encapsulation of sub-micron droplets in the final slurry.

What is claimed is:

1. A process for making microcapsules of an oil which are in dispersion in water comprising the steps of;
    i) forming an initial dispersion of the oil in water in the presence of a surfactant,
    ii) heating the initial dispersion above its phase inversion temperature, to form a bicontinuous phase composition,
    iii) allowing or causing the composition to cool to below the phase inversion temperature so as to form an emulsion of oil droplets in the water and
    iv) encapsulating the oil droplets.

2. A process according to claim 1 in which the oil is one or more or cyclohexane, decahydronaphthalene, xylene, diesel oil, isoparaffin or an alkyl substituted benzene or naphthalene wherein the alkyl group(s) contains from 1 to 20 carbon atoms.

3. A process according to claim 2 in which the oil is a mixture of decahydronaphalene and an alkylnaphalene wherein the alkyl group contains from 1 to 20 carbon atoms.

4. A process according to claim 1 in which the oil has dissolved or dispersed in it a water-insoluble active ingredient.

5. A process according to claim 4 wherein the active ingredient is selected from oil-soluble or oil-dispersible agrochemicals, cosmetics, fragrances, sun-screens, ink-jet dyes, pigments, toners, biocides, pharmaceutical products, veterinary products, and drug delivery systems.

6. A process according to claim 1 in which the ratio of the oil to the water is from 10:90 to 90:10.

7. A process according to claim 1 in which the surfactant comprises a hydrophilic portion and a hydrophobic portion, and the hydrophilic portion comprises a water-soluble moiety that has reduced solubility in water at increased temperature and exhibits a cloud-point in aqueous solution.

8. A process according to claim 6 in which the hydrophilic portion comprises a poly (ethylene glycol) chain of formula;

RO—(CH$_2$CH$_2$O)$_n$— in which R is H or C1–4 alkyl, and is 2 to 100.

9. A process according to claim 1 in which the surfactant is present in an amount of 0.5 to 30% by weight based on the weight of the total emulsion.

10. A process according to claim 1 in which steps (i) and (ii) are combined by making the initial dispersion above the phase inversion temperature.

11. A process according to claim 1 in which the oil droplets are encapsulated by forming a polymer wall around the oil droplets wherein the polymer wall is formed by the reaction of two or more polymer precursors.

12. A process according to claim 11 wherein the precursors which react to form the capsule wall are dissolved in the oil phase before making the initial dispersion and a water soluble phase transfer catalyst is added to the water phase in step (iv) so as to cause reaction between them.

13. A process according to claim 1 in which the components are an aminoplast resin and a crosslinker.

* * * * *